United States Patent [19]

Bloemkolk, deceased et al.

[11] Patent Number: 4,555,373

[45] Date of Patent: Nov. 26, 1985

[54] PRESSING OF REINFORCED THERMOSETTING POLYMER ARTICLES

[75] Inventors: Willem Bloemkolk, deceased, late of Viviers du Lac, by Christiane Bloemkolk, legal representative; André Blanc, La Ravoire, both of France

[73] Assignee: Vitrotex Saint-Gobain, Aubervilliers, France

[21] Appl. No.: 480,312

[22] Filed: Mar. 30, 1983

[30] Foreign Application Priority Data

Mar. 3, 1982 [FR] France ............................ 82 05397

[51] Int. Cl.⁴ .............................................. B29C 1/02
[52] U.S. Cl. ........................................ 264/25; 264/26; 264/DIG. 45; 264/DIG. 46; 264/DIG. 65
[58] Field of Search ........ 264/26, DIG. 46, DIG. 45, 264/25, DIG. 65

[56] References Cited

U.S. PATENT DOCUMENTS

| 3,551,952 | 1/1971 | Morse. | |
| 3,639,190 | 2/1972 | Brooke et al. | 264/26 |
| 3,937,774 | 2/1976 | Wiley et al. | 264/26 |
| 4,423,191 | 12/1983 | Haven et al. | 264/26 |

FOREIGN PATENT DOCUMENTS 950058 of 1964 United Kingdom .

Primary Examiner—Jeffery Thurlow
Attorney, Agent, or Firm—Pennie & Edmonds

[57] ABSTRACT

A reinforced thermosetting polymer, in a pasty state, is molded under conditions of internal heating of the material and dielectric losses with high frequency and external heating using the mold elements.

4 Claims, 4 Drawing Figures

U.S. Patent     Nov. 26, 1985     4,555,373
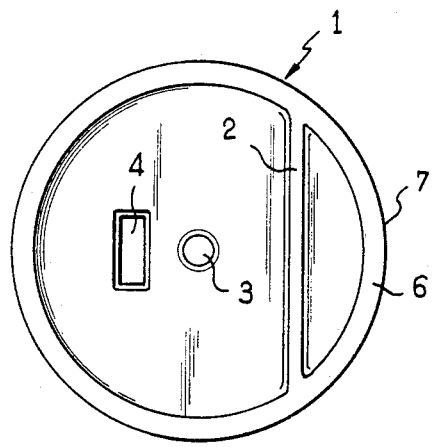
FIG_1a
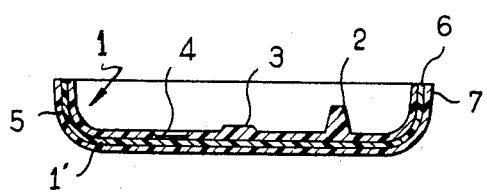
FIG_1b
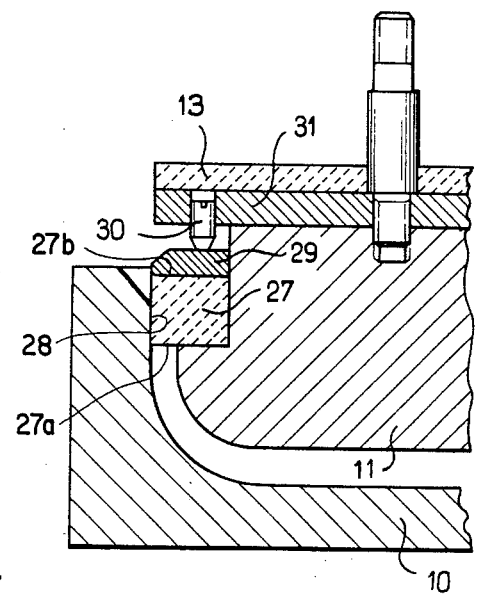
FIG_3
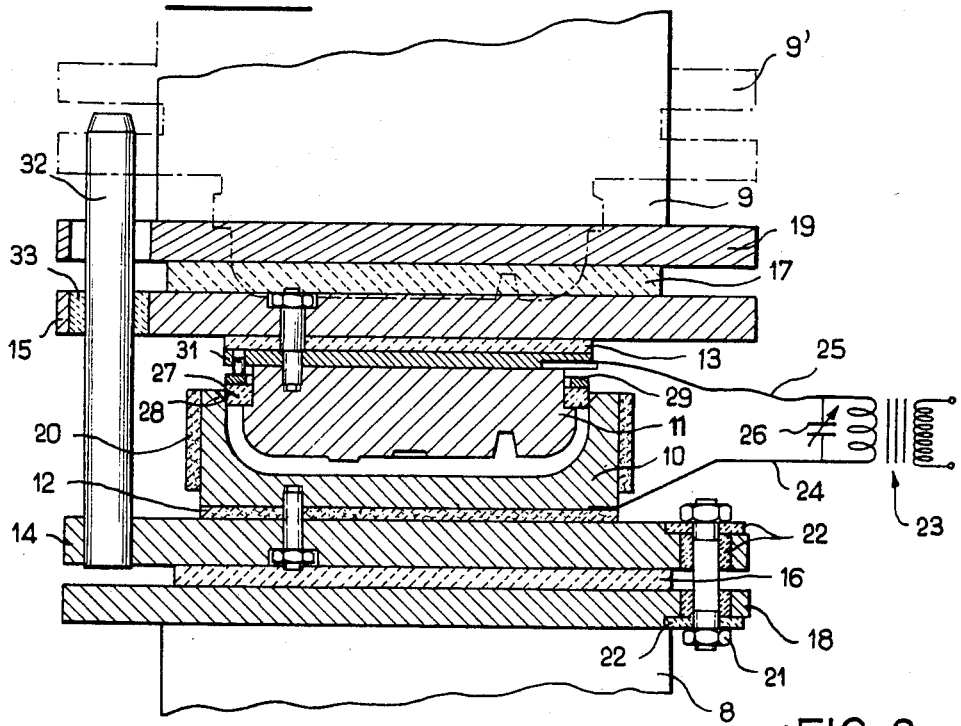
FIG_2

PRESSING OF REINFORCED THERMOSETTING POLYMER ARTICLES

TECHNICAL FIELD

The invention relates to the molding of articles comprised of a reinforced thermosetting polymer. In a more specific aspect, the invention relates to the molding of articles of various shape, which may be intricate or of complicated outline, by molding and polymerization of thin layers, thick layers and even masses of the thermosetting polymer containing fillers preimpregnated with up to 30% or more of a reinforcing glass fiber.

BACKGROUND OF THE INVENTION

The forming of articles comprised of a thermosetting polymer is known. It is also known that the formation of such articles oftentimes may be difficult, and that the techniques utilized may give rise to various drawbacks. In short, the known processes may not be wholly considered commercially feasible.

It is also known that a thermosetting resin in sheet form, containing filler and preimpregnated with a reinforcing glass fiber, may be subjected only to very limited pressure, without the sheet undergoing considerable creep, in making numerous plane or slightly curved panels. The procedure followed may be likened to that of shaping of sheet metal.

If articles of more complicated outline are to be formed, these articles of thermosetting resins may be injection molded. The molding process normally is carried out at high pressure levels as may be the case with thermoplastic resins. However, this process is expensive. The process, thus, is limited in use to that of molding complex pieces. Further, the process is not without various drawbacks introduced because of the resistance to molding imparted by the reinforcing fibers.

Another process of the prior art provides for the medium pressure molding of a material which may be in a pasty state. The molding operation is carried out within a cavity formed by a pair of plates of a standard press. While this process makes possible the formation of articles of variable thickness, and articles which exhibit considerable ribbings, such as curved panels or boxes of varying type, it has not been possible to utilize the process in the formation of complex shapes as may be formed in the implementation of a high pressure, injection molding process.

To reach industrial and commercially feasible rates in the forming of articles, it is normally required to use heat so that after a possible gelling stage there may be a rapid and complete polymerization of the resin. For example, in the process of molding a resin in the pasty state at a medium pressure value, the prior art has resorted to the use of plates of a standard press which are heated by conduction. The heat may derive from the circulation of a heat-carrying fluid.

While the heat conductive capacity of the plates may be satisfactory for purposes of supplying the level of heat for rapid and complete polymerization of the resin, the overall operation is made difficult because of the poor capacity of the materials to conduct heat. The difficulty becomes more pronounced as the thickness of the article which is to be formed increases, say, to several millimeters. Also, occasionally, the polymerization reaction is of an exothermic nature so that rather than taking in heat, the material gives up some supplemental heat.

In short, under normal operating conditions, it is difficult to obtain a homogeneous refluidizing and, consequently, a uniform creep and core polymerization of material to be formed utilizing an external heating agency.

Internal heating of various thermosetting resins, such as, in particular, phenolic resins of polyesters, under the effect of dielectric losses from a high frequency field and through use of the properties of those resins, is known, also. This practice makes it possible to achieve a more uniform, homogeneous heating. This assumes, however, that a sufficient uniformity can be obtained in the electric field. The heat conductivity of the plates of the press and heat loss in the walls may easily result in a drawback opposite to that previously discussed.

In view of this drawback, it has been a suggestion to heat the material before introduction into the mold. The preheating of the material, to a temperature below the gelling temperature, serves to increase the time given to maturation and reduces the temperature gradients without keeping the article being formed in the mold for an excessive period of time.

The preheating of the material provides several advantages. To this end, the preheating of the material facilitates the creep of the mass of material to be molded, and it provides for good filling of the mold. The preheating of material, also, serves to accelerate the rates by shortening the curing time of the material.

In the simplest of situations, the outside face of the mold walls may be provided with a heating system for external heating of the material. The source of external heat may be that of a heat-carrying fluid. These outside faces, also, may serve as electrodes making it possible, after the application of pressure to the material that is molded, to heat the material both internally (by a high frequency field) and externally (by conduction of heat to the object that is being formed).

It has also been proposed to neutralize the cold wall effect of the mold by use of a sheet which previously was polymerized. The polymerized sheet will serve as a facing, to insulate the core of the piece to be molded from the surfaces provided for final forming. On the other hand, it has been suggested to provide the walls of the mold along the mold cavity with a thin inside wall. The walls of the mold, then, could be thermally insulated from the pressure resistant bearing structure so that the walls, constituting the plates of a HF heating capacitor, exhibit only slight thermal inertia. In this manner, the material is not excessively cooled.

Finally, it has been proposed, and it has been found possible, to heat the molded piece while on the mold externally by conduction before the piece is transferred into an oven for polymerization by dielectric heating. Conversely, to assure polymerization, the material may be preheated under high frequency before molding, and then heated during molding by conduction of heat from the mold. Thus, with the latter, crosslinking is completed within the mold without otherwise compensating for possible temperature deviation observed from one stage to another.

One elaborate process is disclosed in French Pat. No. 1,232,996. The process follows several phases, corresponding to three stages of temperature rise. To this end, the process describes an optional preheating, preferably through external preheating, the molding of the material to a desired size and configuration, a rapid dielectric heating under high frequency to cause gelling, and, then, final heating by conduction to complete polymerization.

SUMMARY OF THE INVENTION

The process of the invention is geared to attain a similar final result in a relatively simple manner. To this end, the process of the invention provides for the heating of the material internally to attain a sufficient temperature rise within the core for fluidizing the material, resulting in a complete filling of a mold cavity The heating of the material commences at the time of initial exertion of pressure on the material. The heating of the material internally continues after forming to the desired size, thereby to bring the temperature of the material within the core, while it remains in the mold cavity, to a temperature level as desired. According to the invention, the mold is formed of mold elements having a thickness and calorific capacity at least equal to that of the material that is molded.

The mold is insulated externally and the heat that the material transmits to it by conduction is retained substantially so that the heat which is retained by the mass of the mold may be reused after a minimal idle time to provide a degree of external preheating of material received in the mold cavity.

Once the permanent operating conditions are reached, the process of the invention makes it possible to carry out a molding operation with an effectiveness at least comparable to processes of the prior art, yet in a manner of relative simplicity.

Features and characteristics of the invention will be described in greater detail as the description to be considered with the drawing continues.

DESCRIPTION OF THE DRAWING

FIG. 1a is a plan view of a molded piece formed of reinforced resinous material;

FIG. 1b is a view in section of the molded piece of FIG. 1a;

FIG. 2 is a view in elevation, and partially in section, of a mold for use in carrying out the invention; and FIG. 3 is an enlarged view of a portion of the mold of FIG. 2.

BEST MODE FOR CARRYING OUT THE INVENTION

The article to be formed is illustrated as a molded piece 1 generally having the shape of a pan. Articles of other shape, such as the shape of a truncated conical cup may be formed equally as well. The discussion to follow, directed specifically to that of the pan shaped article, is considered to be a full and complete disclosure of the invention in both the process and the apparatus for carrying out the process which may be used to form articles of substantially any configuration.

Referring to FIGS. 1a and 1b, the molded piece 1 includes a base and an edge 5 of circular outline raised from the base toward a lip 6 at the upper end. A rib 2 extends along and upwardly of the base, terminating at the inner surface of opposite facing edges. A boss 3 also extends upwardly of the base and a recess 4 is located in the surface of the base. The boss is illustrated as taking the form of a truncated cone, while the recess has the shape of a parallelepiped.

In a preferred embodiment, the molded piece may have an overall diameter of 250 mm and a wall thickness of 13 mm. The overall height of the edge 5 may be 40 mm and the lip 6 may be 5 mm wide. The rib 2 which provides strength to the molded piece extends to a height from the base substantially greater than that of the boss 3. The boss extends to a height from the base which is about equal to the depth of the recess in the base (see FIG. 2).

The molded piece 1, further, includes a bearing surface 7 within the vicinity of the upper edge, toward lip 6. The bearing surface is cylindrical in outline and extends throughout a distance of 12 mm. The molded piece may have a mass of 1320 g.

A mold for producing the molded piece 1 may be seen in FIG. 2 and in the partial enlargement of FIG. 3. Referring to FIG. 2, the mold is supported on a pair of jaws 8, 9. The jaws comprise a part of an hydraulic press capable of developing a molding pressure in the range of about 70 tons to be transmitted to material in a mold cavity through a pair of elements upon relative movement of the jaws to a closed position. In the embodiment of the invention illustrated in FIG. 2, jaw 8 is supported in fixed position on a frame (not shown), while the jaw 9 is movable in relation to the fixed jaw between an open position depicted by the dot-dash line representation 9' and the closed position depicted by the full line representation 9. Movement is imparted to the movable jaw 9 through action of an hydraulic jack (not shown) which may be conventional. When the mold is open, a molded piece may be removed from the mold cavity and material to be molded may be introduced to the mold cavity. FIG. 2 represents the closed position of the elements of the mold, and the mold cavity illustrated as empty.

The elements of the mold include a die 10 and a punch 11. The die is supported on the fixed jaw 8 and the punch is supported on the movable jaw 9. Both the die and punch are formed of a light, nonmagnetic metallic alloy, such as an alloy of aluminum or some other metallic alloy capable of transmitting a molding pressure and acting on the material to be molded as heretofore discussed and as will be hereinafter discussed. A metallic alloy that displays the necessary characteristics and others to be mentioned, and one that has been used successfully, is identified by the nomenclature 2017.

In order to more specifically describe the invention, without any intent to limit the same, the die 10 may have a mass of 8 kg, and the punch may have a mass of 7 kg. The masses of both the die and punch are in excess of five times the mass of the molded piece 1 to be formed. The mass is developed by the thick walls of each element which provide for a calorific capacity at least equal to that of the molded piece to be molded.

The die 10 and punch 11 are supported on the jaws 8,9, respectively, in substantially identical fashion. To this end, the die is supported by a pair of mounting plates 14, 18 and a pair of insulating layers 12, 16. More particularly, the insulating layer 12 is interposed between the base of die 10 and mounting plate 14, and the insulating layer 16 is interposed between the two mounting plates. A plurality of bolts, for example, three equidistantly spaced bolts, extend from the base of the die. A lock nut is threaded on each of the respective bolts to secure the mounting plate 14 and die, and interposed insulating layer 12. Only a single bolt and lock nut are illustrated in FIG. 2 because of the section that is presented.

The mounting plates 14, 15 may be formed of the same material as used in forming the die 10 and punch 11. The mounting plates 18, 19 (hereafter "support plates") may be formed of steel for purposes of carrying out a support function.

With respect to punch 11, the punch is supported by a pair of mounting plates 15, 19 and a pair of insulating layers 13, 17. More particularly, the insulating layer 13 is interposed between the base of punch 11 and mounting plate 15, and the insulating layer 17 is interposed between the two mounting plates. The punch and mounting plate 15 may be mechanically connected as described in mounting die 10 and mounting plage 14.

The insulating layers 12, 13 may be formed of asbestos cement, while the insulating layers 16, 17 may be formed of a fluoro resin, such as polytetrafluoroethylene. The insulating layers 12, 13 may have a thickness of 5 mm, providing, essentially, a thermal insulative role. To this end, the insulating layers 12, 13 make it possible to retain and accumulate heat within the inside of the mold as may be released during the molding operation. The insulating layers 16, 17, on the other hand, may have a thickness of 25 mm, providing, essentially, the role of an electrical insulator. In addition, the insulating layers function to distribute the pressure on the mold.

A skirt 20 is disposed about the die 10. The skirt will provide further thermal insulative capability for additional retention and accumulation of heat as may be lost from the mold. The skirt may either partially or totally surround the die.

Support plates 18, 19 are mounted on the jaws 8, 9, respectively. Any manner of mounting of structures may be used. Mounting plates 14, 15, and the interposed insulating layers 16, 17, are secured to support plates 18, 19, respectively.

As may be seen in FIG. 2, each of the mounting and support plates are of a planar dimension greater than that of any insulating layer and of the die 10 as insulated by insulating skirt 20. Each of the support plates, within the region of their outer edge, is provided with a plurality of equidistantly spaced bores, and a similar plurality of bores are located in coaxial relation in each of the mounting plates. A bolt or other securing instrumentality may extend through the paired bores and a lock nut 21 may be threaddedly received on opposite ends of each bolt. A collar and ring assembly 22 of ceramic material may be received in each bore for purposes of insulating the mounting and the support plates from one another.

Conductors 24, 25 electrically connect the die 10 and punch 11 to a generator 23. The generator has an available power rating of 5 kW. The conductors 24, 25, respectively, are connected at one end at the output terminals of a transformer and at the other end to the base of die 10 and punch 11. In a preferred embodiment of the invention, the generator provides current at a voltage output of 2 kV. The frequency of the generator may be 13.5 MHz. The intensity of the generator may be adjusted by adjustment of a tuning circuit in the form of a variable capacitor 26. At least the conductor 25 is comprised of flexible metal braid so that the punch may be capable of opening and closing movement. The electrical connection of the die and punch result in these elements of the mold constituting two plates of a capacitor. As such, it is possible to create a high frequency electric field within the cavity of the mold and consequently within the material undergoing a molding operation.

Referring now to the enlarged presentation of FIG. 3, a seal 27 is supported within an annular recess of punch 11, along a shoulder at the base of the punch. The seal is annular in outline and comprised of a rigid insulating material. The seal extends radially outwardly of the recess. The seal includes a lower or inside face 27a to seal the upper annular opening of the cavity along the face of wall 28 of die 10 as the movable jaw 9 and punch 11 move toward the closed position. The inside face, therefore, provides a surface for delimiting the upper lip 6 of the molded piece 1. The face of the wall is cylindrical in outline thereby to provide the outside bearing surface 7 along the edge 5.

The annular recess is cut to a depth to provide a clearance between the upper face 27b of seal 27 and a mounting plate 31 of a light alloy supported between the base of punch 11 and insulating layer 13. The seal 27 is formed of a rigid, wear resistant material which will not adhere to the material received in the cavity of the mold. The material of the seal, further, has only a sufficiently slight coefficient of dielectric loss. A seal formed of a rigid core of polyamide reinforced with glass fibers and coated with a polytetrafluorethylene antiadherent layer has been used successfully.

A flange 29 is supported on the upper face 27b of seal 27. A plurality of screws 30 supported equidistantly around the periphery of mounting plate 31, and adjustably movable into engagement with the flange, enable the flange to act in reaction to any deforming pressures as may act on or be transmitted to the seal during the molding process when the seal is subjected to a considerable value of stress. The flange, thus, maintains the seal in a practically deformation-free condition.

As may be necessary, spacing is maintained between metal parts of the fixed and movable jaws 8, 9 of the mold and the elements connecting the die 10 and punch 11 to their respective jaw, or further insulation is provided, to avoid the appearance of discharge between the capacitor plates.

A small amount of play exists between seal 27 and the wall 28 of die 10. The amount of play on the order of 0.2 mm is substantially constant throughout the entire periphery of the mold. The existence of an amount of play creates a slot which has been found sufficient to permit entrapped air to escape from the mold cavity as the punch 11 descends into the die 10 and moves to the closed position of the mold. The play, and the slot which it creates, however, is small enough so that escaping of the fiber resin material within the mold cavity during molding is impaired by capillary action to the outside of the mold.

As punch 11 descends, the fiber resin material within the mold cavity is forced upwardly around the lower edge of the punch to reach the region of seal 27. The fiber resin material, thus, fills the entire inside space of the mold cavity and as it fills the space it drives out the air. In the closed position of the mold the increase in pressure resulting from the incompressibility of the fiber resin material will balance the pressure of the hydraulic jack. The pressure of the hydraulic jack may be set to a value of 20 to 30 bars.

Movable jaw 9 of the mold is supported for movement relative to fixed jaw 8. To this end, a plurality of columns are supported by mounting plate 14. The columns are arranged at equidistant spacing around the mounting plate and extend coaxially toward movable jaw 9. The mounting and support plates 15, 19 each are provided with a similar plurality of bores and these plates are received for movement along the columns. The bores each have an internal diameter substantially greater than the diameter of the columns. Rings 33 of a ceramic insulating material for electrically insulating mounting plates 14, 15 are received in the bores of mounting plate 15. The rings, also, provide a guide function in movement of the movable jaw 9. Similar rings could be located within the bores of support plates 19, as well.

High frequency heating begins at that point in time when the mold has closed to the position that an electric field of sufficient strength appears between the capacitor plates comprised of die 10 and punch 11. In practice, generator 13 may be started substantially at the moment seal 27 begins to close the mold cavity. Normally, the intensity of the electric field increases as the punch approaches the closed position of the mold. However, it is desirable to maintain the electric field constant throughout travel of the punch. Suitable control of variable capacitor 26 will enable an electric field of desired value to appear as soon as possible during movement of punch 11 to the closed position, and by tuning the capacitor, and the generator, as a function of travel of the punch the desired value of the electric field may be maintained constant throughout this movement. Movement of the punch and tuning of the capacitor may be under control of a program.

Thus, the material is heated internally, as soon as, or substantially as soon as a molding pressure is exerted on the material, and after forming the molded piece, while it remains in the mold cavity, permitting the mold elements through their calorific capacity to store the heat transmitted to them by conduction and to reuse the heat after removal of the molded piece to provide partial heating of material which thereafter is used to fill the mold cavity.

A system of ejectors (not shown) which may be electrically insulated are provided for ejecting the molded piece 1 at the end of the molding operation. Such ejectors which may be of standard design are well known.

The following examples of making molded pieces will more fully describe the invention. In one example, the molded pieces formed of polyester are characterized by the article of FIGS. 1a and 1b, and in the other example the molded pieces (not shown) are characterized by a truncated conical cup of smaller dimension.

In the first example, a thick molding compound preimpregnated material, cut into circular pellets, and having a surface mass of 42 kg/m² is used. In the second example, a sheet molding compound preimpregnated material, cut into square shaped blocks, and having a surface mass of 5 kg/m² is used. The composition of the product, the main dimension of the molded piece and the main molding parameters for each example are set out below.

| Preimpregnated Material | Thick molding compound Thick (1 layer) | Sheet molding compound (Thin (6 layers) |
|---|---|---|
| Dimension of Blocks (mm) | φ 200 × 12 | φ 80 × 12 |
| Composition (parts by weight) | | |
| polyester resin[1] | 100 | 100 |
| calcium carbonate[2] | 130 | 100 |
| polyethylene powder[3] | 3 | 3 |
| zinc stearate | 3 | 3 |
| titanium oxide | 3 | 0 |
| magnesium oxide (in paste form) | 4.8 | 1 |
| tertiobutyl perbenzoate | 1[4] | 1[5] |
| Glass fiber reinforcement[6] | 100 | 100 |
| Molded piece | | |
| Mass (g) | 1320 | 200 |
| Diameter (mm) | 250 | 170 |
| Thickness (mm) | 13 | 5 |
| Height (mm) | 40 | 30 |
| Molding | | |
| Maximum pressure (bars) | 30 | 20 |
| Mold Temperature (°C.) | 145 | 125 |
| Supply voltage (kV) | 2 | 2 |
| Frequency (MHz) | 13.5 | 13.5 |
| HF power used (kW) | 21 | 1.7 |
| Operating Cycle | | |
| Loading of mold (sec) | 10 | 10 |
| Closing of seal (sec) | | |
| Turning on of power (sec) | 3 | 3 |
| Filling of cavity (sec) | ~30 | ~30 |
| Curing | | |
| Stop HF (sec) | ~230 | ~50 |
| Ejection (sec) | 4 | 4 |
| Opening of mold (sec) | 5 | 5 |
| TOTAL (sec) | 270 | 90 |

[1] Leguwal W 20, supplied by Bayer
[2] Millicarb, supplied by Omya
[3] Plast-Labor Coathylene
[4] Trigonox C
[5] Trigonox 215
[6] EC 17 4800 P279, supplied by VSG In the first example, tests were conducted with a preimpregnated material consisting of three superposed layers. Each layer was about 4 mm in thickness, of the same composition, but of different color. FIGS. 1a and 1b illustrate the molded piece that was formed. Contrary to normal occurrences during a standard molding operation when the mold is retained at a low temperature, the molded piece of the invention, as seen in the section, includes three layers of the material, each of which has flowed practically in the same way to present layers of substantially equal thickness throughout the entire section.

The present invention makes possible the molding of reinforced thermosetting polymers into a molded piece at rapid rates and in a relatively simple manner.

We claim:

1. The process of pressure molding a charge of reinforced thermosetting polymeric material into a molded piece comprising exerting pressure by relative movement of a pair of mold elements toward one another and said charge of material within a mold cavity, substantially simultaneously subjecting said charge of material to internal heating by dielectric losses under high frequency, maintaining said internal heating during formation of a molded piece under pressure, and until said molded piece is cured, all the while bringing the core of said molded piece to a prescribed temperature, said mold elements being thermally isolated from outside ambient conditions and having a calorific capacity at least equal to that of the material from which said molded piece is formed whereby heat transmitted from the mold cavity by conduction is stored in said mold elements, and using the mold elements as an external heat source to at least partially heat the next charge of said material as soon as it is introduced to said mold cavity after removal of said molded piece.

2. The process of claim 1 wherein said core of said molded piece is heated uniformly.

3. The process of claim 1 wherein said internal heating is controlled by a high frequency generator and commences substantially upon closing of said mold.

4. The process of claim 3 wherein said high frequency generator is timed as a function of movement of said mold elements to maintain said internal heating by dielectric losses under high frequency substantially constant.

* * * * *

UNITED STATES PATENT AND TRADEMARK OFFICE
CERTIFICATE OF CORRECTION

PATENT NO. : 4,555,373

DATED : November 26, 1985

INVENTOR(S) : WILLEM BLOEMKOLK, Deceased et al

It is certified that error appears in the above-identified patent and that said Letters Patent is hereby corrected as shown below:

Masthead, line [73] the Assignee should be Vetrotex Saint-Gobain line [30], the date of filing of the priority application should be March 30, 1982.

Signed and Sealed this

Twenty-seventh Day of May 1986

[SEAL]

Attest:

DONALD J. QUIGG

Attesting Officer

Commissioner of Patents and Trademarks